United States Patent [19]

Watanabe et al.

[11] Patent Number: 4,838,839
[45] Date of Patent: Jun. 13, 1989

[54] MULTI-DISK FLUID VISCOSITY TYPE AUTO-TENSIONER

[75] Inventors: Toshiki Watanabe, Kamakura; Toshiharu Honda, Fujisawa, both of Japan

[73] Assignee: Nippon Seiko Kabushiki Kaisha, Tokyo, Japan

[21] Appl. No.: 132,203

[22] Filed: Dec. 14, 1987

[30] Foreign Application Priority Data

Jan. 19, 1987 [JP] Japan .................................. 62-8075
Jul. 16, 1987 [JP] Japan ................................ 62-176032

[51] Int. Cl.⁴ .............................................. F16H 7/12
[52] U.S. Cl. .................................. 474/135; 188/322.5
[58] Field of Search ............... 474/101, 107, 111, 113, 474/117, 123, 135; 188/290, 293, 322.5

[56] References Cited

U.S. PATENT DOCUMENTS

2,661,915 12/1953 O'Conner ...................... 188/322.5 X
4,525,152 6/1985 Speer et al. ....................... 474/135 X
4,596,538 6/1986 Henderson ........................... 474/135
4,689,037 8/1987 Bytzek ................................ 474/135
4,725,260 2/1988 Konorowski et al. .............. 474/135

Primary Examiner—William P. Neuder
Attorney, Agent, or Firm—Shapiro and Shapiro

[57] ABSTRACT

An auto-tensioner has a fixed portion fixed portion fixed to a base, a displaceable device displaceable with respect to the fixed portion and contacting a belt, a tensioning device for urging the displaceable device so as to impart a tension to the belt while absorbing a portion of any fluctuation in the tension, and a vibration absorbing device disposed between the fixed portion and the displaceable device and capable of absorbing a portion of the fluctuation in the tension. The vibration absorption device includes a multi-disk fluid viscosity vibration damper having a least one fixed disk member fixed in relation to the fixed portion, at least one displaceable disk member displaceable together with the displaceable device, and a fluid which produces a viscosity resistance against the displacement of the displaceable disk member with respect to the fixed disk member.

25 Claims, 7 Drawing Sheets

MULTI-DISK FLUID VISCOSITY TYPE AUTO-TENSIONER

BACKGROUND OF THE INVENTION

1. Field of the Invention

The present invention relates to an auto-tensioner for maintaining the tension in a belt at a constant level. More particularly, the present invention is concerned with a multi-disk fluid viscosity type auto-tensioner capable of stably maintaining a constant tension in a driving belt used in an automotive engine, such as a timing belt for driving a cam shaft or cam shafts in an overhead cam shaft (OHC) or dual overhead cam shaft (DOHC) engine or an auxiliary machine drive belt in such an engine.

2. Related Background Art

The auto-tensioner of the invention finds a wide use in various machines having driving belts which are required to be tensed at a constant level. The following description, however, will be focused on a toothed drive belt used in an OHC or a DOHC automotive engine wound around toothed pulleys mounted on the engine block. Toothed drive belts are known which are used for transmitting power between to toothed pulleys which are mounted on a cylinder block, such as, for example, a timing belt for driving a cam shaft or cam shafts in an OHC or DOHC engine stretched between timing pulleys. Usually, a certain level of initial tension is imparted by a fixed-type tensioner to such a belt in order to prevent slip of the toothed belt and the timing pulley. In modern automotive engines having engine blocks made of aluminum, for example, a problem arises due to a difference in the thermal expansion coefficient between the aluminum engine block and the belt which is made of a rubber reinforced with a metallic wire. The aluminum engine block has a thermal expansion coefficient which is about four times as large as that of the belt, so that the level of the tension in the belt is largely changed by a change in the temperature. Namely, when the temperature is low, the distance between the pulleys is decreased by an amount greater than the amount of contraction of the belt so that the belt becomes loose, with the result that the belt vibrates largely or slips on the pulleys. Conversely, when the temperature is high, the distance between the pulleys is increased by an amount greater than the amount of thermal expansion of the belt, so that the belt is excessively tensed to increase the level of noise or to adversely affect the durability of the belt.

In order to overcome these problems encountered by the fixed-type tensioner, there have been proposed tensioners having a function for automatically compensating any change in the tension as disclosed, for example, in Japanese Patent Laid-Open Nos. 208343/1982 and 49054/1984.

These proposed tensioners have an elastic damping material placed between the rotary part rotatable in contact with the belt and the stationary part fixed to the engine block, the elastic vibration damper material being compressed when the tension in the belt tends to increase, thereby maintaining the tension at a moderate level.

In this type of tensioner, the elastic damping material is always loaded by the tension in the belt so that it is plastically deformed over time. The plastically deformed vibration damper material can no longer compensate for loosening of the belt and allows problems such as vibration of belt and slip of the belt to occur.

SUMMARY OF THE INVENTION

Accordingly, an object of the present invention is to provide an auto-tensioner having a simple construction but yet capable of stably maintaining a predetermined level of tension in a belt.

Figure 3:
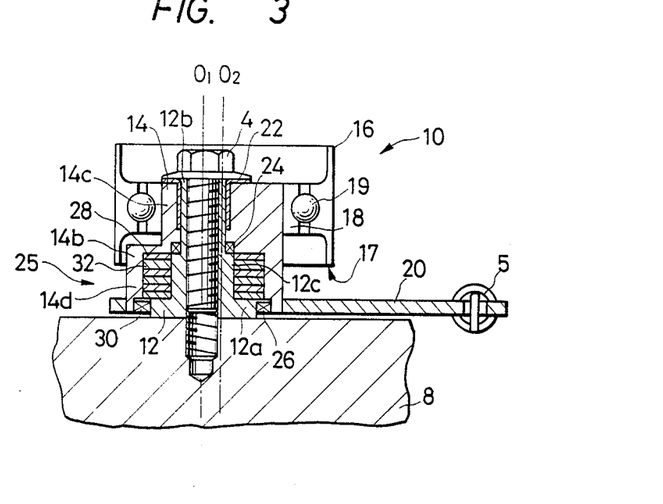
FIG. 3 is a sectional view taken along the line I—I of FIG. 2.

To this end, according to the present invention, there is provided an auto-tensioner which comprises, referring to FIG. 3, a fixed portion 12 fixed to an engine block 8 as a base, displacable means 14, 17 displacable with respect to the fixed portion and contacting a belt, tensioning means 5 for urging the displacable means so as to impart a tension to the belt while absorbing a portion of any fluctuation in the tension, and a multi-disk viscous fluid vibration damper having disk members and a viscous fluid arranged in a space 30 formed between the fixed portion and the displacable means.

The viscous fluid charged between the disks produces a viscous resistance to any displacement of the displacable means with respect to the stationary part, so that any change in the tension in the belt is absorbed and suppressed by the displacement of the displacable member.

DESCRIPTION OF THE PREFERRED EMBODIMENTS

A preferred embodiment of the auto-tensioner of the invention, designed for use together with a timing belt for an OHC automotive engine, will be described hereinafter with reference to the drawings.

Figure 1:
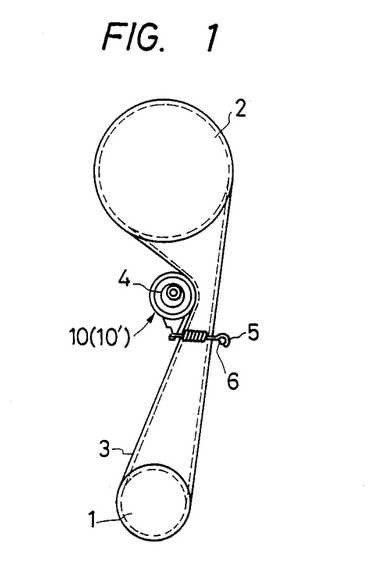
FIG. 1 is a plan view of an embodiment of a first embodiment of auto-tensioner of the invention in a state of use.
Figure 2:
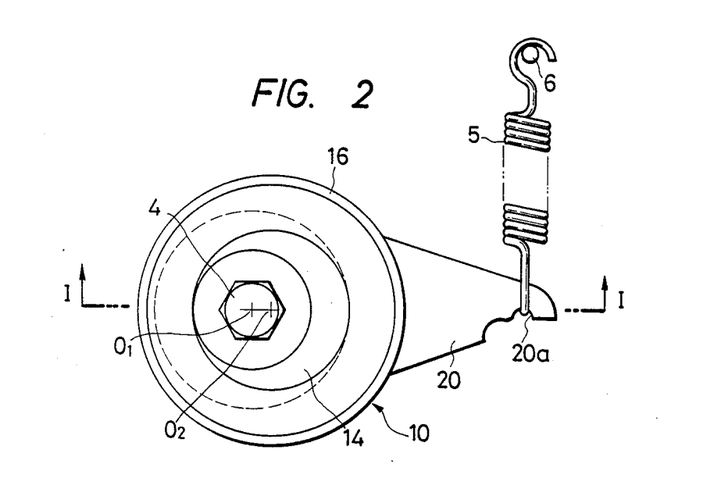
FIG. 2 is an enlarged plan view the auto-tensioner shown in FIG. 1.
Figure 4:
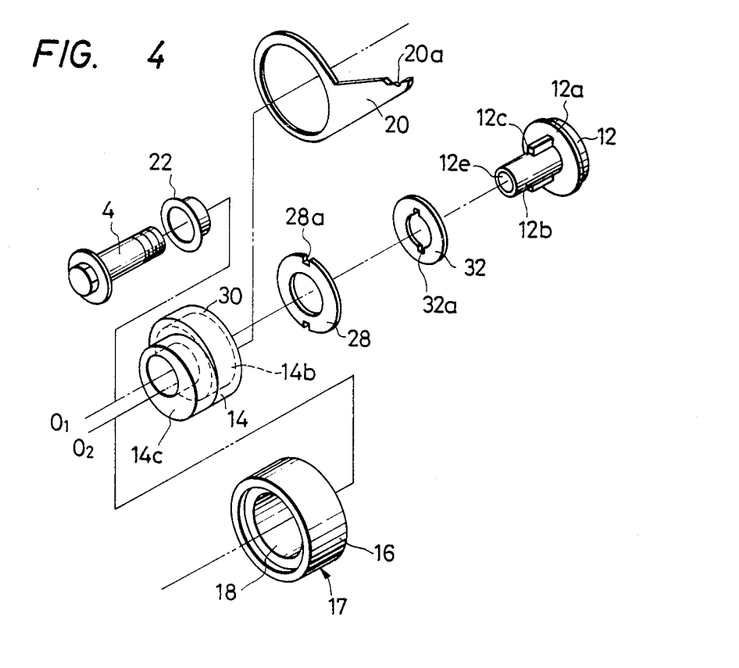
FIG. 4 is an exploded perspective view of the first embodiment of the auto-tensioner.
Figure 5:
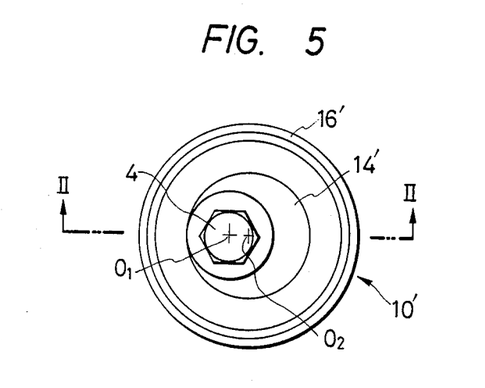
FIG. 5 is a plan view of a second embodiment of the auto-tensioner in accordance with the present invention.
Figure 6:
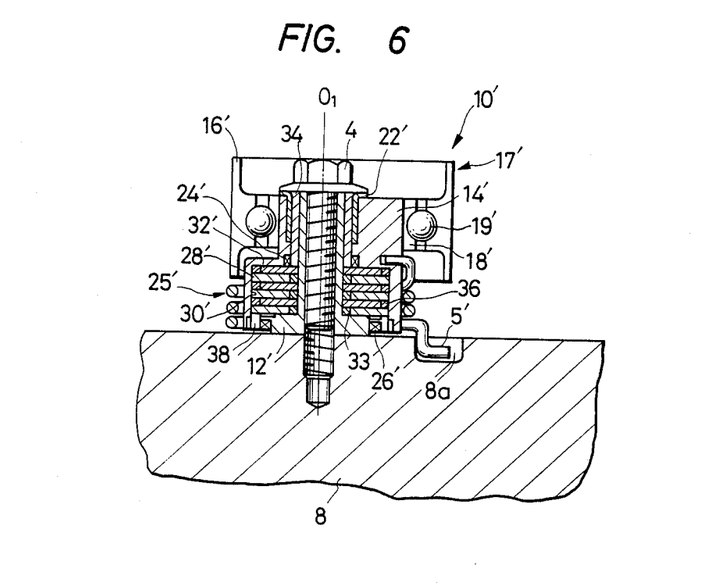
FIG. 6 is a sectional view taken along the line II—II of FIG. 5.
Figure 7:
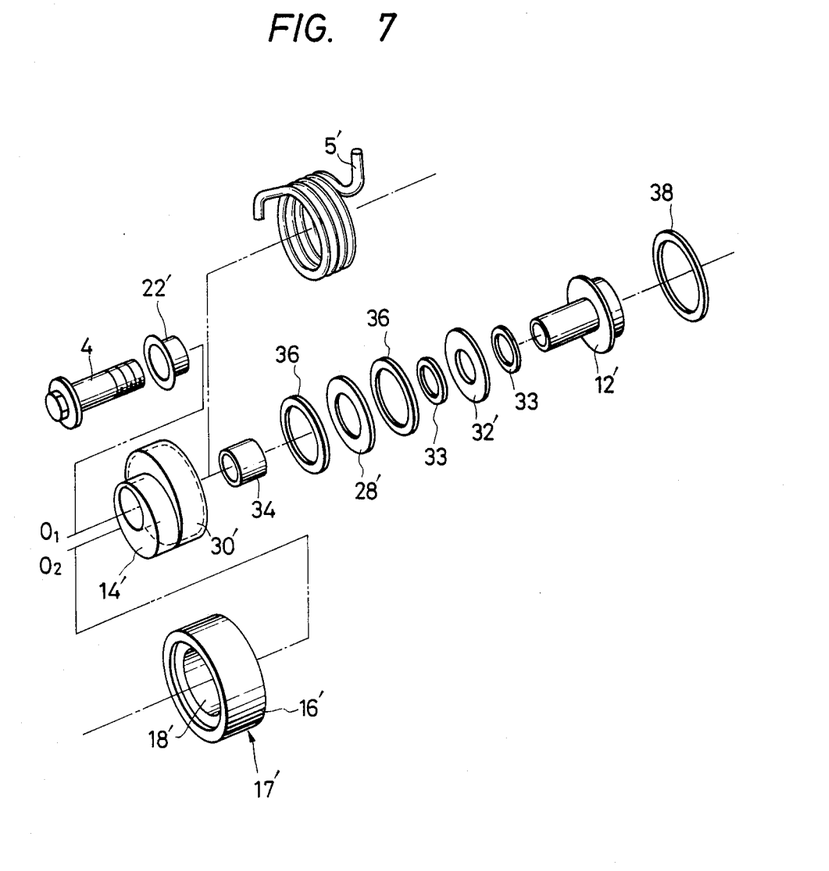
FIG. 7 is an exploded perspective view of the second embodiment.

FIGS. 1 to 4 show a first embodiment of the auto-tensioner generally denoted by 10, while FIGS. 5 to 7 show a second embodiment of the auto-tensioner generally denoted by 10'. In particular, FIG. 1 shows the first embodiment of the auto-tensioner 10 used for tensioning a timing belt 3 of an OHC automotive engine.

Referring to the first embodiment, the timing belt 3 is stretched between a crankshaft timing pulley 1 and a cam shaft timing pulley 2 which are carried, respectively, by a crankshaft and a cam shaft (both are not shown) projecting from an engine block 8 (see FIG. 3). The timing belt 3 is toothed at its inner surface for engagement with teeth on the outer peripheries of the timing pulleys 1 and 2 so as to be able to transmit the torque of the crankshaft 1 to the cam shaft.

The auto-tensioner 10 is secured to the engine block 8 in such a manner as to impart a predetermined tension on the order of, for example, 20 to 30 kgf to the timing belt 3. More specifically, the auto-tensioner 10 has a pulley bearing 17 the outer race 16 of which is held in contact with the outer surface of the timing belt 3, and is fixed to the engine block 8 by means of a flanged bolt 4 through a fixed shaft 12. The pulley bearing 17 has, besides the above-mentioned outer race 16, an inner race 18 and rolling members 19 placed between both races. The inner race 18 is fitted on an oscillation sleeve 14 and carries the outer race 18 through the intermediary of the rolling members 19. A bracket 20 is fixed to the oscillation sleeve 14 which is disposed between the inner race 18 and the fixed shaft 12. The bracket 20 extends along the engine block 8. A coiled spring 5 is stretched between the pin 6 projecting from the engine block 8 and the end 20a of the bracket 20 so as to urge the bracket 20 towards the timing belt 3. Thus, the whole auto-tensioner 10 is biased towards the timing belt 3. The oscillation sleeve 14, pulley bearing 17, inner race 18, rolling members 19, outer race 16 and the bracket 20 constitute a displacable means which is displacable with respect to a stationary part constituted by the fixed shaft 12. The coiled spring 5 serves as means for imparting tension.

Although in the illustrated embodiment the outer race 16 integrally has a portion contacted by the timing belt 3 and a portion which provides a track for the rolling members 19, this is not required and the arrangement may be such that both portions may be constructed as separate members, e.g., a bearing outer race and a belt pulley on the outer race.

The fixed shaft 12 is composed of a cylindrical bottom portion 12a contacting the engine block 8 and a tubular portion 12b which extends from the cylindrical bottom portion 12a in the direction away from the engine block 8. A flanged bolt 4 is inserted into a central bore 12e formed in the fixed shaft 12. The threaded end of the bolt 4 is screwed into a threaded hole in the engine block 8 so that the fixed shaft 12 is fixed to the engine block 8.

The oscillation sleeve 14 has a first cylindrical portion 14b and a second cylindrical portion 14c. The first cylindrical portion 14b has an axis $O_1$ which coincides with the fixed shaft 12, while the second cylindrical portion 14c has an axis $O_2$ which is offset with respect to the axis of the fixed shaft 12, as will be seen from FIGS. 2 to 4.

The first cylindrical portion 14b of the oscillation sleeve 14 surrounds the circular bottom portion 12a of the fixed shaft 12 and is rotatably carried through a slide bearing 22. In this state, an annular space 30 is defined between the oscillation sleeve 14 and the circular bottom portion 12a of the fixed shaft. The slide bearing 22 has a collar which is placed between the end of the second cylindrical portion 14c of the oscillation sleeve 14 and the flange of the flanged bolt 4 so as to reduce the friction between the oscillation sleeve 14 and the flange of the flanged bolt 4. The oscillation sleeve 14 is rotatable about the axis $O_1$ of the first cylindrical portion 14b thereof.

The annular space 30 accommodates a multi-disk fluid viscosity type vibration damper 25 which is designed to provide a viscous resistance against the rotation of the oscillation sleeve with respect to the fixed shaft 12.

The multi-disk fluid viscosity vibration damper 25 is composed of a plurality of disks and a viscous fluid such as a silicone oil filling the gaps between the adjacent disks.

There are two types of disks employed in this vibration damper: namely, fixed disks 32 associated with the fixed shaft 12 and displacable disks 28 associated with the oscillation sleeve 14. A plurality of fixed and displacable disks 32 and 28 are arranged alternatingly. FIG. 4 shows only one pair of these disks 32, 28. The stationary disks 32 and the displacable disks 28 are provided with key-ways 32a and 28a which receive keys 12c and 14d on the fixed shaft 12 and the oscillation sleeve 14, respectively, and are assembled together with the fixed shaft 12 and the oscillation sleeve 14.

The fixed shaft 12 has a pair of key projections 12c which project radially outwardly therefrom at diametrically opposing portions, while the oscillation sleeve 14 is provided with a pair of key projections 14d which project radially inwardly therefrom at diametrically opposing portions. The described number and positions of the key projections 12c, 14c, however, are only illustrative. Thus, the number and positions of these key projections 12c, 14d are variable in relation to those of the key-ways 32a and 28a such that the respective disks 32 and 28 are fixed to the fixed shaft 12 and the oscillation sleeve 14 in the rotational direction.

The stationary disk 32 is an annular member sized and shaped such that its outer peripheral surface does not contact with the projections 14d in the oscillation sleeve 14 and such that its inner bore fits on the tubular portion 12b of the fixed shaft 12. The stationary disk 32 has the key-way 32a for engagement with the key projection 12c on the fixed shaft 12.

The displacable disk 28 has an outside diameter smaller than the inside diameter of the first cylindrical portion 14b of the oscillation sleeve so that it may be received in the annular space 30 in the oscillation sleeve 14. The inside diameter of the displacable disk 28 is large enough to clear the key projection 12c on the fixed shaft 12. The displacable disk 28 has a key-way 28a which is sized to fit on the key projection 14d on the oscillation sleeve 14.

In the assembly of the vibration damper, the viscous fluid is applied to the disks 32 and 28 and these two types of disks are stacked alternatingly with their key-ways 28a and 32a fitting on the respective key-projections 14d and 12c and are placed in the space 30. The upper and lower ends of the space 30 are sealed by means of seals 24 and 26 which are fitted in grooves formed in the oscillation sleeve 14 and the fixed shaft 12. A predetermined minute gap is left between each adjacent disks 32 and 28 provided by the thickness of the film of the sealed fluid such as a silicone oil.

When the oscillation sleeve 14 is rotated relative to the fixed shaft 12 due to vibration and impact which are transmitted to the oscillation sleeve 14 through the pulley bearing 17, the fluid between the adjacent disks 32 and 28 provides a certain level of viscous resistance, thus absorbing such vibration and impact.

A second embodiment of the present invention will be described with reference to FIGS. 5 to 7 in which primed reference numerals with dashes are used to denote parts which correspond to those in the first embodiment.

The second embodiment of the auto-tensioner, denoted by a numeral 10', is discriminated from the first embodiment by the arrangement for urging the displacable means towards the belt and by the construction of the multi-disk viscous vibration damper.

The auto-tensioner 10' has an oscillation sleeve 14' fitted on a fixed shaft 12' which is fixed to the engine block 8 through a flanged bolt 4. A pulley bearing 17' has an inner race 18' which fits on the outer peripheral surface of the oscillation sleeve 14' so as to be displaced as a unit with the latter. The pulley bearing 17' further has an outer race 16' which is rotatably carried by the inner race 18' through the intermediary of rolling members 19'.

A coiled spring 5', which is retained at its one end by the sleeve 14', is wound around the oscillation sleeve 14'. The other end of the coiled spring 5' is received in and held by a hole 8a formed in the engine block 8. The coiled spring 5' serves as a tensioning means which urges the displacable means constituted by the pulley bearing 17' and the oscillation sleeve 14' towards the belt 3 so as to impart a predetermined level of tension to the belt 3, while absorbing a portion of any change in the tension of the belt 3. The tubular portion of the fixed shaft 12' carries a long spacer seat 34 which in turn carries, through a slide bearing 22', the oscillation sleeve 14'.

In this state, a space 30' is defined between the fixed shaft 12' and the oscillation sleeve 14' in order to receive a multi-disk viscous vibration damper 25'.

The viscosity vibration damper 25' has a plurality of fixed disks 32' and a plurality of displacable disks 28'. In order to maintain predetermined gaps between the disks 28' and 32', spacers 33, 36, long spacers 34 and snap rings 38 are used as shown in FIG. 7.

The stationary disk 32' is an annular member having an inside diameter slightly greater than the outside diameter of the tubular portion of the fixed shaft 12' and an outside diameter slightly smaller than the inside diameter of the spacer 36. On the other hand, the displacable disk 28' has an inside diameter slightly greater than the outside diameter of the spacer 33 and an outside diameter slightly smaller than the inside diameter of the space 30'.

The spacer 33 fits on the tubular portion of the fixed shaft 12' and is received in the central hole of the displacable disk 28'. The spacer 36 is an annular member which is sized to be received in the space defined between the stationary disk member 32' and the inner peripheral surface of the oscillation sleeve 14' defining the space 30'.

The spacers 33 are arranged alternatingly with the fixed disks 32' so as to maintain a predetermined gap between adjacent disks 32'. The uppermost fixed disk 32' is pressed onto the circular bottom portion of the fixed shaft 12' by means of bolt 4 through the intermediary of the long spacer 34, so that the disks 32' are fixed to the fixed shaft 12' through the spacers 33. In consequence, the fixed disks 32' are fixedly held by the fixed shaft 12' integrally therewith.

The spacers 36 are arranged alternatingly with the displacable disks 28' so as to keep a predetermined gap between adjacent disks 28'.

The lowermost disk 28' is pressed and fixed by means of a snap ring 38 so that the disks 28' are fixed to the oscillation sleeve 14' through the intermediary of the spacers 36. Therefore, the displacable disks 28' are rotatable about the axis $O_1$ together with the oscillation sleeve 14'.

FIG. 7 is an exploded view of the auto-tensioner 10'. One displacable disk 28' and one fixed 32' are shown by way of example together with two spacers 33 and two of the spacers 36. The numbers of the disks 28' and 32' can be determined according to various conditions and the numbers of the spacers are determined in accordance with the numbers of the disks 28' and 32'.

In the assembly, a viscous fluid is applied to the disks 28' and 32' and these disks 28' and 32' are placed in the space 30' together with the spacers 33 and 36 in a manner described. The upper and lower ends of the space 30' are sealed by sealing members 24' and 26' received in grooves formed on the oscillation sleeve 14' and the fixed shaft 12'.

Predetermined gaps are formed between adjacent displacable disks 28', as well as between adjacent fixed disks 32', by means of the spacers 33 and 36. Minute gaps also are formed between the adjacent disks 28' and 32' by the film of the viscous fluid.

In operation, any change in tension occurring in the belt 3 is received by the outer race of the pulley bearing 17', so that a part of the change in the tension is received by the coiled spring 5' while the other is absorbed by the multi-disk viscous vibration damper.

The construction of the second embodiment is somewhat complicated as compared with that of the first embodiment, due to the use of the spacers. The use of the spacers, however, is effective in keeping the required intervals between the disks. In order to keep minute gaps between the displacable and fixed disks, it is possible to disperse fine particles of a particle size on the order of several tens of microns in the viscous fluid. Such particles are preferably of a resin, particularly a polyamide resin. From the view point of the production cost, it is advantageous to keep the gaps by means of axial projections on the disks.

In the described embodiments, the multi-disk viscous vibration damper effectively maintains a constant tension in the belt, thus eliminating troubles such as flutter or slip of the belt, thus prolonging the life of the belt and reducing the noise produced by the belt.

A description will be made hereinafter as to a first modification of the multi-disk viscous vibration damper which is improved to eliminate any play between the fixed shaft and inner plates (fixed disks), as well as between the outer sleeve (oscillation sleeve) and the outer plates (displacable disks), while allowing a precise adjustment of the gaps between the inner and outer plates without necessitating a substantial rise in the cost, thereby preventing reduction in the function attributable to the play and achieving a quick and accurate attenuation effect.

In this modification, at least one of the fixed disk and the fixed portion provided with the fixed disk or the displacable portion is provided with axial projections. The axial projections form a space in which only the displacable disk and the fluid exists. Within this space, the displacable disk is movable in the axial direction by a predetermined amount. When the multi-disk viscosity vibration damper operates, it is possible to adjust the displacable disk at a predetermined position by making use of the balance of the shearing force acting in the fluid.

Figure 8:
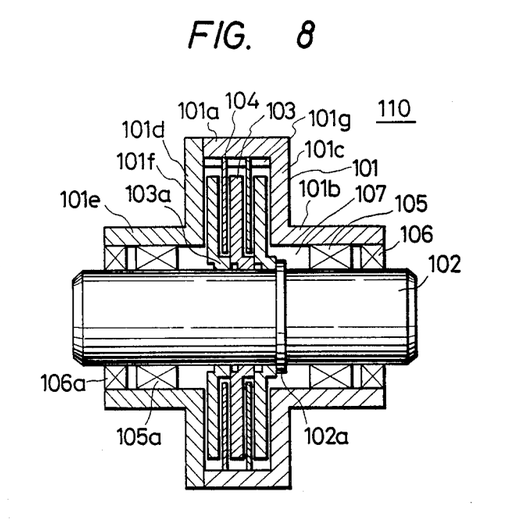
FIG. 8 is a sectional view of a multi-disk viscous vibration damper used in the auto-tensioner of the invention taken along the axis thereof.

FIG. 8 is a sectional view of the first modification of the multi-disk viscous vibration damper used in the auto-tensioner of the invention, taken along the axis of the damper. The first modification, denoted generally by 110, has an outer sleeve 101 which has a central large-diameter cylindrical portion 101a and a right small-diameter cylindrical portion 101b which are connected coaxially through a right side wall portion 101c. An outer sleeve cover 101f has a left small-diameter cylindrical portion 101e of a shape substantially the same as the right small-diameter cylindrical portion 101b and a left side wall portion 101d similar to the right side wall portion 101c. The outer sleeve cover 101f is coaxially and hermetically connected to the outer sleeve 101 by suitable means such as bolts, with its left side wall portion 101d contacting the central large-diameter cylindrical portion 101a. An axial groove 101g having a semi-circular cross-section is formed in a portion of the inner peripheral surface of the central large-diameter cylindrical portion 101a of the outer sleeve 101. The outer sleeve 101 and the outer sleeve cover 101f as a unit are supported on a shaft 102 through right and left bearings 105 and 105a so that the outer sleeve 101 and the outer sleeve cover 101f as a unit are rotatable about the axis of the shaft 102. The shaft 102 is provided on the outer peripheral surface thereof with a flange 102a and carries three disk-shaped inner plates 103. A pair of disk-shaped outer plates 104 are provided on the inner peripheral surface of the central large-diameter cylindrical portion 101a such that they face the inner plates 103. The space defined by the outer sleeve 101, outer sleeve cover 101f and the shaft 102 is charged with a viscous fluid 107 which is in this case a silicone oil. The fluid is prevented from leaking outside by oil seals 106, 106a which are provided on the outer sides of the bearings 105 and 105a.

Figure 9:
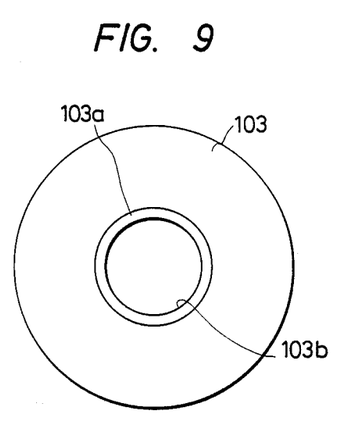
FIG. 9 is a top plan view of an inner plate in a first modification of the multi-disk viscous vibration damper.

The inner plate 103 and the outer plate 104 will be described in detail with reference to FIGS. 9 and 10. FIG. 9 illustrates the disk-shaped inner plate 103 as viewed from the right side in FIG. 8. The inner plate 103 has an outside diameter which is slightly smaller than the inside diameter of the central large-diameter cylindrical portion 101a of the outer sleeve 101 and is provided with a central circular opening 103b having a diameter slightly smaller than the outside diameter of the shaft 102. The inner plate 103 has an annular ridge or projection 103a formed on one side thereof around the opening 103b so as to project axially therefrom. The axial height of projection 103a is uniform over the entire circumference thereof and is slightly greater than the thickness of the outer plate 104.

Figure 10:
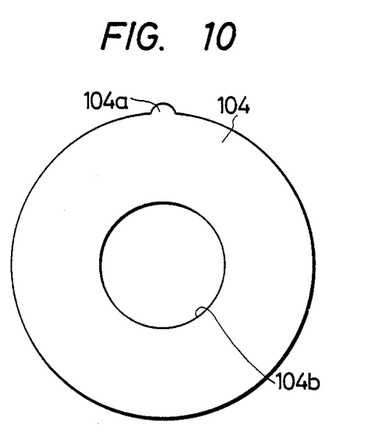
FIG. 10 is a top plan view of an outer plate in the first modification of the multi-disk viscous vibration damper.

FIG. 10 is a top plan view of the disk-shaped outer plate 104. The outer plate 104 has a circular opening 104b of a diameter slightly greater than that of the annular projection 103a of the inner plate 103. The outer peripheral surface of the outer plate 104, which has a diameter slightly smaller than the inside diameter of the central large-diameter cylindrical portion 101a, is provided with a tongue 104a which has a semi-circular cross-section of the groove 101g formed in the inner surface of the outer sleeve 101 but slightly smaller than the groove 101g.

Referring again to FIG. 8, the first modification of the multi-disk viscous vibration damper is assembled such that the inner plates 103 are press-fit on the shaft 102 and axially stacked with the projection 103a of the innermost plate abutting the flange 102a on the shaft 102. It will be seen that an equal gap is maintained between the adjacent inner plates by virtue of the presence of the projections 103a. On the other hand, the outer plates 104 are mounted axially displaceably with their tongues 104a engaging with the groove 101g, such that both surfaces of the outer plates 104 face the adjacent inner plates 103. Since the inner plates are press-fit to the shaft 102 and since the tongues 104a of the outer plates 104 are engaged in the groove 101g formed in the outer sleeve 101, when the outer sleeve 101 is rotated with respect to the shaft 102, the outer plates 104 rotate substantially simultaneously with the outer sleeve 101 so as to impart a shearing force to the viscous fluid 107. The shearing force tends to cause the inner plates 103 to rotate but the inner plates 103 cannot be rotated because they are fixed to the shaft 102. Since the outer plates 104 are axially displaceable, constant gaps are formed between the outer plates 104 and the inner plates 103 thanks to the balance of the shearing force acting on the viscous fluid on both sides of each outer plate 104. It is therefore possible to obtain a quick and accurate attenuation effect. In the described embodiment, the inner plate 103 can be formed by press working from a sheet material.

Figure 11:
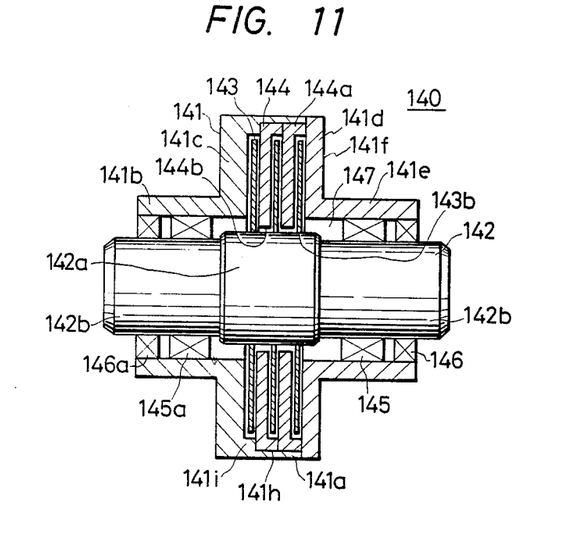
FIG. 11 is a sectional view of a second modification of the multi-disk viscous vibration damper taken along the axis thereof.

FIG. 11 is a sectional view of a second modification of the multi-disk viscosity vibration damper used in the auto-tensioner of the invention, taken along the axis thereof. In this Figure, the parts or members corresponding to those in first modification are denoted by the reference numerals equalling the sum of the corresponding numerals appearing in FIG. 8 plus forty (40).

Referring to FIG. 11, the multi-disk viscosity vibration damper 140 has an outer sleeve 141 which has a central large-diameter cylindrical portion 141a and a small-diameter cylindrical portion 141b which are connected coaxially through a side wall portion 141c. An outer sleeve cover 141f has a left small-diameter cylindrical portion 141e of a shape substantially the same as the small-diameter cylindrical portion 141b and a side wall portion 141d similar to the side wall portion 141c. The outer sleeve cover 141f is coaxially and hermetically connected to the outer sleeve 141 by suitable means such as bolts, with its side wall portion 141d contacting the central large-diameter cylindrical portion 141a. The inner peripheral surface of the central large-diameter cylindrical portion 141a of the outer sleeve 141 is provided with a large-diameter portion 141h which extends over a predetermined axial length from the free end of the outer sleeve 141.

The outer sleeve 141 and the outer sleeve cover 141f as a unit are supported on a shaft 142 through right and left bearings 145 and 145a so that the outer sleeve 141 and the outer sleeve cover 141f as a unit are rotatable about the axis of the shaft 142. The shaft 142 is provided with journal portions 142b at both ends and a central increased-diameter portion 142a which has a diameter greater than that of the shaft 142. The juncture between the large-diameter portion 142a and the shaft 142 is chamferred. The outer periphery of the increased diameter portion 142a is partially cut-away in the axial direction along a plane which contacts the outer peripheral surface of the end journal portion 142b of the shaft 142. There are three disk-shaped inner plates 143 on the increased diameter portion 142a. On the other hand, a pair of disk-shaped outer plates 144 are received in the large-diameter portion 141h of the bore of the outer sleeve 141 such that each outer plate 144 faces adjacent inner plates 143 at both sides. The space defined by the outer sleeve 141, outer sleeve cover 141f and the shaft 142 is charged with a viscous fluid 147 which is in this case a silicone oil. The fluid is prevented from leaking outside by oil seals 146, 146a which are provided outside the bearings 145 and 145a.

The inner plate 143 has an opening 143b having a shape conforming with the outer configuration of the increased diameter portion 142b of the shaft 142 and having a size slightly greater than that of the increased diameter portion 142 of the shaft. On the other hand, the disk-shaped outer plate 144 has an opening 144b which is slightly greater than the outside diameter of the increased-diameter portion of the shaft 142. The outer plate 144 is further provided with an annular protrusion or projection which projects axially from one side thereof. The outside diameter of the outer plate 144 is substantially the same as the inside diameter of the increased diameter portion 141h of the bore in the outer sleeve 141. The outside diameter of the inner plate 143 is slightly smaller than the inside diameter of the projection 144a of the outer plate 144.

The central increased-diameter portion 141a of the outer sleeve 141 is composed of the above-mentioned large-diameter portion 141h and another portion which is constituted by an annular stepped portion 141i. The inside diameter of the annular stepped portion 141i is substantially the same as the inside diameter of the projection 144a of the outer plate 144. The axial size of the increased-diameter portion 141h as measured from the free end of the outer sleeve 141 is slightly smaller than the total axial length provided by the projections 144a of two outer plates 144 stacked in the axial direction. When the outer sleeve cover 141f is hermetically connected to the outer sleeve 141, it axially presses the projections 144a so that the projection 144a of the inner one of two outer plates 144 is pressed onto the annular stepped portion 141i. As the fixing means such as bolts are tightened, the outer plates 144 are fixedly mounted in the outer sleeve 141.

Thus, the modification 140 explained in connection with FIG. 11 is different from the first modification shown in FIG. 8 in that the outer plates are fixed while the inner plates are allowed to move axially. More specifically, in this modification 140, the outer plates 144 are fixed to the outer sleeve 141 as described, while the inner plates 143 are carried by the central increased-diameter portion 142b of the shaft 142 in such a manner as to be movable only in the axial direction. Therefore, if the outer sleeve 141 is rotated about the axis of the shaft 142 which is held stationary, the outer plate 144 is allowed to rotate together with the outer sleeve 141 so as to impart a shearing force to the viscous fluid 147 which in turn tends to cause the inner plates 143 to rotate. However but the inner plates 143 are not displaced substantially in the rotational direction because the inner plates 143 are allowed to move only in the axial direction with respect to the shaft 142. Furthermore, since the inner plates 143 are axially displaceable, equal gaps are formed between each side of inner plate and the opposing outer plates by virtue of the balance of the shearing force acting on both sides of the inner plate. Thus, the second modification 140 also provides a quick and accurate attenuation effect.

Figure 12:
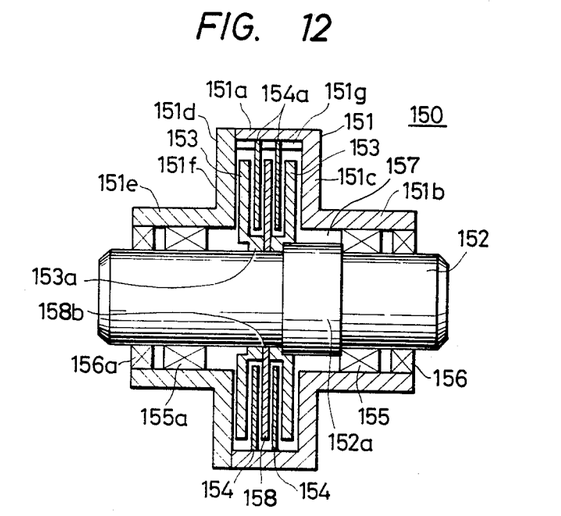
FIG. 12 is a sectional view of a third modification of the multi-disk viscous vibration damper taken along the axis thereof.

FIG. 12 is a sectional view of a third modification of the multi-disk viscosity vibration damper 150. In this figure, the parts or members corresponding those in the first modification are denoted by the reference numerals equalling the corresponding sum of the numerals used in the first modification plus 50 (fifty).

Referring to FIG. 12, the third modification denoted generally by 150 has an outer sleeve 151 which has a central large-diameter cylindrical portion 151a and a right small-diameter cylindrical portion 151b which are connected coaxially through a right side wall portion 151c. An outer sleeve cover 151f has a left small-diameter cylindrical portion 151e of a shape substantially the same as the right small-diameter cylindrical portion 151b and a left side wall portion 151d similar to the right side wall portion 151c. The outer sleeve cover 151f is coaxially and hermetically connected to the outer sleeve 151 by suitable means such as bolts, with its left side wall portion 151d contacting the central large-diameter cylindrical portion 151a. An axial groove 151g having a semi-circular cross-section is formed in a portion of the inner peripheral surface of the central large-diameter cylindrical portion 151a of the outer sleeve 151. The outer sleeve 151 and the outer sleeve cover 151f as a unit are supported on a shaft 152 through right and left bearings 155 and 155a so that the outer sleeve 151 and the outer sleeve cover 151f as a unit are rotatable about the axis of the shaft 152. The shaft 152 is provided on the outer peripheral surface thereof with a flange 152a adjacent to the right side wall portion 151c of the outer sleeve 151. The shaft 152 also carries a pair of disk-shaped inner plates 153 and a spacer 158 sandwiched between these inner plates 153. A bore formed in the central large-diameter cylindrical portion 151a of the outer sleeve 151 receives a pair of disk-shaped outer plates 154 such that each of the outer plates faces one of the inner plates 153 at its one side and the spacer 158 at its other side. The space defined by the outer sleeve 151, outer sleeve cover 151f and the shaft 152 is charged with a viscous fluid 157 which is in this case a silicone oil. The fluid is prevented from leaking outside by oil seals 156, 156a which are provided on the outer sides of the bearings 155 and 155a.

The inner plate 153 has the same shape as the inner plate 103 of the first modification (see FIG. 9), while the outer plate 154 has the same shape as the outer plate 104 of the first modification 110, so that detailed description is omitted in regard to the inner plate 153 and the outer plate 154. The outer sleeve 151 and the outer sleeve cover 151f have the same shapes as the outer sleeve 101 and the outer sleeve cover 101f of the first modification 110. Thus, the manner in which the outer sleeve 151 and the outer plates 154 engage with each other is the same as that between the outer sleeve 101 and the outer plates 104 of the first modification, so that detailed description is omitted also in this connection.

The spacer 158 has an opening 158b which has a diameter slightly smaller than the outside diameter of the shaft 152. The outside diameter of the spacer 158 is equal to the outside diameter of the inner plate 153. The inner plates 153 face each other with the spacer 158 sandwiched therebetween and are press-fit onto the shaft 152 in this state. The right inner plate 153 contacts at the rear side of the projection 153a thereof with the flange 152a on the shaft 152. The other end of the flange 152a contacts with the bearing 155. By virtue of the presence of the projections 153a, equal gaps are formed between both inner plates 153 and the spacer 158.

As explained above, the inner plates 153 and the spacer 158 are press-fit onto the shaft 152, while the outer plates 154 engage at their tongues 154a with the groove 151g formed in the inner peripheral surface of the outer sleeve 151. Therefore, when the outer sleeve 151 is rotated about the shaft 152 while the latter is fixed, the outer plates 154 rotate substantially simultaneously with the outer sleeve 151 so as to impart a shearing force to the viscous fluid 157 which in turn would tend to cause the inner plates 153 and the spacer 158 to rotate, but the inner plates 153 and the spacer 158 do not rotate because they are fixed to the shaft 152. On the other hand, the outer plates 154 are axially movable so that equal gaps are maintained between the outer plate 154 and the inner plate 153 and between the outer plate 154 and the spacer 158 by virtue of the balance of the shearing force of the viscous fluid on both sides of each outer plate 154. It is thus possible to obtain a quick response and accurate attenuation of vibration.

Figure 13:
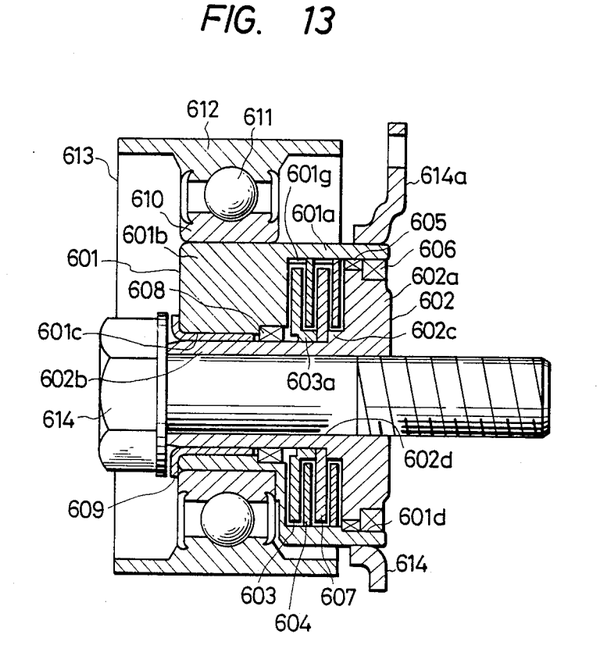
FIG. 13 is a sectional view of an auto-tensioner for use with a flat belt, incorporating a fourth modification of the multi-disk viscous vibration damper, taken along the axis of the vibration damper.

FIG. 13 shows an embodiment of the auto-tensioner in accordance with the present invention, specifically designed for use together with a flat belt and incorporating a fourth modification of the multi-disk viscous vibration damper.

In this embodiment, the multi-disk viscous vibration damper has an outer sleeve 601 composed of a large-diameter tubular portion 601a and a cylindrical portion 601b which are offset from each other. The cylindrical portion 601b has a circular opening 601c which is coaxial with the large-diameter tubular portion 601a. A groove 601g of a semi-circular cross-section is formed in a portion of the inner wall of the large-diameter tubular portion 601a over a predetermined axial length. An increased-diameter portion 601d is formed in the large-diameter tubular portion 601a having an inside diameter substantially the same as the distance between the axis of the large-diameter tubular portion 601a and the bottom of the groove 601g so as to extend between the free end of the large-diameter tubular portion 601a and the groove 601g. The outer sleeve 601 is supported at its increased-diameter portion 601d by a base shaft 602 through a bearing 605 and at its cylindrical portion 601b through a bearing 608 so as to be able to rotate about the base shaft 602. The base shaft 602 has a disk portion 602a and a tubular portion 602b which are coaxially connected to each other, and is provided with an axial circular opening 602d. The bearing 605 is carried by the disk portion 602a, while the bearing 608 is placed on the tubular portion 602b. An annular step portion 602c is formed at the juncture between the disk portion 602a and the tubular portion 602b. The base shaft 602 carries an inner plates 603 and a spacer 607.

The large-diameter tubular portion 601a of the outer sleeve 601 accommodates a pair of outer plates 604 which are positioned such as to sandwich spacer 607 therebetween. A viscous fluid, which is in this case a silicone oil, is charged in the space defined by the outer sleeve 601 and the base shaft 602. The viscous fluid is prevented from leaking outside by an oil seal 606 provided to the outer side of the bearing 605 and another oil seal (not shown) disposed to the inner side of the bearing 608.

The inner plate 603, spacer 607 and the outer plate 604 are the same as the inner plate 153, spacer 157 and the outer plate 154 so that detailed description is omitted in connection with these members.

The step or projection 602c on the base shaft 602 has the same function as the projection 603a of the inner plate 603. The spacer 607 is press-fit to the tubular portion 602b until it contacts the step 602c, and the inner plate 603 is press-fit until the projection 603a thereof contacts the spacer. The two outer plates 604 are positioned such that they are slightly spaced from the outer peripheries of the projection 603a and the step 602c. The radial distance between one of two outer plates 604 and the projection 603a adjacent thereto is equal to the radial distance between the other outer plate 604 and the step 602c adjacent thereto. The distance between the disk portion 602a and the spacer 607 is equal to the distance between the spacer 607 and the inner plate 603.

A pulley bearing 613 fitting on the tubular portion 601b of the outer sleeve 601 is composed of an inner race 610, balls 611 and an outer race 612 which plays the role of a pulley. Thus, the outer race 612 is rotatable on the outer sleeve 601. A bolt 614 is inserted into a circular opening 602d of the base shaft 602 and is screwed into a base member (not shown) whereby the base shaft 602 is fixed to the base by the bolt 614, such that the disk portion 602a of the base shaft 602 contacts the base (not shown). Since the outer sleeve 601 is spaced from the base even after the fixing of the base shaft 602 to the base, the outer sleeve 601 is allowed to rotate. An annular bracket 614 provided on one end thereof with a claw 614a is provided on the outer surface of the outer sleeve 601. The claw 614a is pulled by a spring (not shown) so that a constant level of tension is maintained in the belt (not shown).

In operation, the bearing pulley 613 is rotated by the belt (not shown) running in contact therewith. Any change in the state of running of the belt due to, for example, vibration is transmitted to the bearing pulley 613 so that a vibratory force the direction of which changes at a high frequency is applied to the outer sleeve 601 through the inner race 610. A portion of such a force is absorbed by the above-mentioned spring (not shown) while almost the whole of the remainder force is utilized for shearing the viscous fluid so as to be converted into heat. Thus, the vibratory force is absorbed almost completely.

In this embodiment also, when the outer sleeve 601 is subjected to the above-mentioned vibratory force, the outer plate 604 is rotated almost simultaneously with the outer sleeve 601, but the inner plate 603 and the spacer 607 which are fixed to the base shaft 602 are never rotated though a rotational force is applied thereto through the viscous fluid 607. In addition, since the outer plates 604 are allowed to move axially, equal gaps are maintained between one of the outer plates 604 and the inner plate 603 and the spacer, and between the other of the outer plates 604 and the spacer 607 and the disk portion 602a, by virtue of the balance of shearing force of the viscous fluid acting on both sides of each outer plate 604. It is thus possible to obtain a quick response with an accurate attenuation of vibration.

The embodiment described with reference to FIG. 13 may be modified such that the inner plate 603 is omitted, with a single outer plate 604 placed in a space formed between the spacer 607 and the disk portion 602a of the base shaft 602. Although in the described embodiment the step 602c of the base shaft 602 is contacted by the spacer 607, this is only illustrative and the arrangement may be such that the step 602c is contacted by the side of the inner plate 603 devoid of the projection 603a. Namely, an effect equivalent to that produced by the described embodiment can be obtained by arranging the outer plate in the space formed between the inner plate 603 contacting the step 602c and the disk portion 602a of the base shaft 602. An equivalent effect is also obtainable by an arrangement in which the inner plate 603 is placed with its projection 603a held in contact with the step 602c, and an outer plate 604 with a suitably increased thickness is placed in a space formed between the disk portion 602a of the base shaft 602 and the inner plate 603. The arrangement also may be such that an outer plate 604 of a suitably increased thickness is placed in a space defined between a pair of inner plates 603 which are positioned such that their projections 603a abut each other.

Although preferred embodiments of the invention and first to fourth modifications of the multi-disk viscous vibration damper have been described, the described embodiments and modifications are only illustrative and are not meant to limit the scope of the invention. Rather, various changes and further modifications are possible within the scope of the invention. For instance, the auto-tensioner of the invention provides an appreciable vibration damping effect even by a combination of a single inner plate and a single outer plate, though the numbers of these plates are preferably large in order to maximize the vibration damping effect.

As will be understood from the foregoing description, the multi-disk viscous vibration damper used in the auto-tensioner of the invention effectively reduces any play between the shaft and the inner plates or between the outer sleeve and the outer plates, thereby obviating any degradation of the attenuation effect attributable to the presence of such a play. Furthermore, the invention provides an inexpensive means which automatically regulates the distances between adjacent plates of the multi-disk viscosity vibration damper, thus offering a vibration absorbing means which can provide superior vibration attenuation effect without increased production costs.

We claim:

1. An auto-tensioner comprising:
   a fixed portion fixed to a base;
   displaceable means supported on said fixed portion for rocking movement about an axis of said fixed portion, said displaceable means having a cylindrical outer member which contacts a belt and surrounds said fixed portion, said outer member being rotatable about an axis offset from the first-mentioned axis;
   tensioning means for biasing said displaceable means so as to impart a tension to said belt and for absorbing fluctuation in said tension; and
   vibration absorbing means disposed between said fixed portion and said displaceable means for absorbing fluctuation in said tension;
   wherein said vibration absorbing means includes a multi-disk fluid viscosity vibration damper having at least one fixed disk member fixedly attached to said fixed portion, at least one displaceable disk member attached to said displaceable means in such a manner as to be non-rotatable with respect to said displaceable means but axially displaceable with respect thereto, and a fluid which produces a viscosity resistance against displacement of said displaceable disk member with respect to said fixed disk member.

2. An auto-tensioner according to claim 1, wherein a plurality of said fixed disk members are alternately arranged with a plurality of said displaceable disk members.

3. An auto-tensioner according to claim 2, wherein successive fixed disk members are spaced from each other by a spacer.

4. An auto-tensioner according to claim 1, wherein said fluid viscosity vibration damper is accommodated in a space defined between said fixed portion and said displaceable means.

5. An auto-tensioner according to claim 2, wherein opposing fixed and displaceable disk members are spaced from each other across a gap which is determined by fine particles dispersed in said fluid.

6. An auto-tensioner according to claim 2, wherein successive fixed disk members are spaced from each other across a minimum gap determined by a projection formed on one of said successive disk members.

7. An auto-tensioner according to claim 1, wherein said fluid is a silicone oil.

8. An auto-tensioner according to claim 1, wherein said fixed disk member and said displaceable disk member are spaced from each other by a predetermined distance which is determined by projection means disposed therebetween.

9. An auto-tensioner according to claim 1, wherein at least one of said fixed disk member and said fixed portion is provided with an axial projection which provides, in the direction in which it extends, a space in which said viscous fluid is present and in which said displaceable disk member to is axially displaceable within a predetermined limit.

10. An auto-tensioner according to claim 9, wherein said projection is provided on said fixed disk member and held in contact with said fixed portion, and wherein said displaceable disk member is disposed in a space which is formed between said fixed disk member and said fixed portion.

11. An auto-tensioner according to claim 9, wherein a plurality of said fixed disk members are used, at least one said fixed disk member has at least one said projection, said one projection abuts an adjacent fixed disk member so as to form a space between said one and said adjacent fixed disk members, and said space receives said displaceable disk member.

12. An auto-tensioner according to claim 9, wherein said projection is provided on said fixed portion and abuts said fixed disk member so as to form a space between said fixed disk member and said fixed portion, and wherein said displaceable disk member is received in said space.

13. An auto-tensioner comprising:
   a fixed portion fixed to a base;
   displaceable means supported on said fixed portion for rocking movement about an axis of said fixed portion, said displaceable means having a cylindrical outer member which contacts a belt and surrounds said fixed portion, said outer member being rotatable about an axis offset from the first-mentioned axis;
   tensioning means for biasing said displaceable means so as to impart a tension to said belt and for absorbing fluctuation in said tension; and
   vibration absorbing means disposed between said fixed portion and said displaceable means for absorbing fluctuation in said tension;
   wherein said vibration absorbing means includes a multi-disk fluid viscosity vibration damper having at least one displaceable disk member fixedly attached to said displaceable means, at least one fixed portion disk member attached to said fixed portion in such a manner as to be non-rotatable in relation to said fixed portion but axially movable in relation thereto, and a fluid which produces a viscosity resistance against displacement of said displaceable disk member relative to said fixed portion disk member.

14. An auto-tensioner according to claim 13, wherein a plurality of said fixed portion disk members are alternately arranged with a plurality of said displaceable disk members.

15. An auto-tensioner according to claim 14 wherein successive displaceable disk members are spaced from each other by a spacer.

16. An auto-tensioner according to claim 13, wherein said fluid viscosity vibration damper is accommodated in a space defined between said fixed portion and said displaceable means.

17. An auto-tensioner according to claim 14, wherein opposing fixed portion and displaceable disk members are spaced from each other across a gap which is determined by fine particles dispersed in said fluid.

18. An auto-tensioner according to claim 14, wherein successive displaceable disk members are spaced from each other across a minimum gap determined by a projection formed on one of said successive disk members.

19. An auto-tensioner according to claim 13, wherein said fluid is a silicone oil.

20. An auto-tensioner according to claim 13, wherein at least one of said displaceable disk member and said displaceable means is provided with an axial projection which provides, in the direction in which it extends, a space in which said fluid is present and in which said fixed portion disk member is axially displaceable within a predetermined limit.

21. An auto-tensioner according to claim 20, wherein said projection is provided on said displaceable disk member and is held in contact with said displaceable means, and said fixed portion disk member is received in a space formed between said displaceable disk member and said displaceable means.

22. An auto-tensioner according to claim 20, wherein a plurality of said displaceable disk members are used, said projection of at least one of said displaceable disk members abuts an adjacent displaceable disk member so as to form a space between said one and said adjacent displaceable disk members, and said space receives said fixed portion disk member.

23. An auto-tensioner according to claim 20, wherein said projection is provided on said displaceable means and abuts said displaceable disk member so as to form a space between said displaceable disk member and said displaceable means, and fixed portion disk member is received in said space.

24. An auto-tensioner comprising:
a cylindrical fixed portion fixed to a base;
a displaceable means comprising a cylindrical portion having a bore in which said fixed portion is received and being supported on said fixed portion for rocking movement about an axis of said fixed portion, and a cylindrical outer member contacting a belt and surrounding said fixed portion, said outer member being supported on said cylindrical portion and rotatable about an axis offset from the first-mentioned axis;
tensioning means for biasing said displaceable means so as to impart a tension to said belt and for absorbing fluctuation in said tension; and
vibration absorbing means disposed in said bore in an annular space between said cylindrical portion and said fixed portion for absorbing fluctuation in said tension;
wherein said vibration absorbing means includes a multi-disk fluid viscosity vibration damper having at least one fixed disk member fixedly attached to said fixed portion, at least one displaceable disk member attached to said displaceable means in such a manner as to be non-rotatable with respect to said displaceable means but axially movable with respect thereto, and a fluid which produces a viscosity resistance against displacement of said displaceable disk member with respect to said fixed disk member.

25. An auto-tensioner comprising:
a cylindrical fixed portion fixed to a base;
displaceable means comprising a cylindrical portion having a bore in which said fixed portion is received and being supported on said fixed portion for rocking movement about an axis of said fixed portion, and a cylindrical outer member contacting a belt and surrounding said fixed portion, said outer member being supported on said cylindrical portion and rotatable about an axis offset from the first-mentioned axis;
tensioning means for biasing said displaceable means so as to impart a tension to said belt and for absorbing fluctuation in said tension; and
vibration absorbing means disposed in said bore in an annular space between said cylindrical portion and said fixed portion for absorbing fluctuation in said tension;
wherein said vibration absorbing means includes a multi-disk fluid viscosity vibration damper having at least one displaceable disk member fixedly attached to said displaceable means, at least one fixed portion disk member attached to said fixed portion in such a manner as to be non-rotatable in relation to said fixed portion but axially movable in relation thereto, and a fluid which produces a viscosity resistance against the displacement of said displaceable disk member with respect to said fixed portion disk member.

* * * * *